United States Patent
Wang et al.

(10) Patent No.: US 6,458,478 B1
(45) Date of Patent: Oct. 1, 2002

(54) THERMOELECTRIC REFORMER FUEL CELL PROCESS AND SYSTEM

(75) Inventors: Chi S. Wang, 5923 Fairmont, Woodridge, IL (US) 60517; J. Daniel Lyons, Wheaton, IL (US)

(73) Assignee: Chi S. Wang, Woodridge, IL (US)

( * ) Notice: Subject to any disclaimer, the term of this patent is extended or adjusted under 35 U.S.C. 154(b) by 257 days.

(21) Appl. No.: 09/657,387

(22) Filed: Sep. 8, 2000

(51) Int. Cl.$^7$ ............................. H01M 8/04; H01M 8/00
(52) U.S. Cl. ............................. 429/17; 429/13; 429/22
(58) Field of Search .............................. 429/13, 17, 19, 429/22, 23, 24, 25, 26, 30

(56) References Cited

U.S. PATENT DOCUMENTS

| | | | |
|---|---|---|---|
| 4,120,787 A | * 10/1978 | Yargeau | 210/167 |
| 5,211,923 A | 5/1993 | Harkness et al. | 423/220 |
| 5,248,566 A | 9/1993 | Kumar et al. | 429/19 |
| 5,366,821 A | * 11/1994 | Merritt et al. | 429/21 |
| 5,409,784 A | * 4/1995 | Bromberg et al. | 180/65.3 |
| 5,484,978 A | * 1/1996 | Hedberg et al. | 110/238 |
| 5,602,297 A | 2/1997 | Wang | 588/207 |
| 5,794,732 A | * 8/1998 | Lorenz et al. | 180/65.3 |
| 5,843,395 A | 12/1998 | Wang | 423/573.1 |
| 5,876,469 A | * 3/1999 | Moriya et al. | 422/197 |
| 5,887,554 A | * 3/1999 | Cohn et al. | 123/3 |
| 5,899,175 A | * 5/1999 | Manikowski et al. | 123/3 |
| 5,925,322 A | 7/1999 | Werth | 422/170 |
| 5,976,724 A | * 11/1999 | Bloomfield | 204/DIG. 4 |
| 5,997,594 A | 12/1999 | Edlund et al. | 48/76 |
| 6,245,309 B1 | * 6/2001 | Etievant et al. | 204/164 |
| 6,348,278 B1 | * 2/2002 | LaPierre et al. | 422/196 |
| 6,376,113 B1 | * 4/2002 | Edlund et al. | 429/17 |
| 6,383,670 B1 | * 5/2002 | Edlund et al. | 422/108 |

OTHER PUBLICATIONS

Bromberg, L., A. Rabinovich, N. Alexeev,. and D.R. Cohn, "Plasma Reforming of Diesel Fuel," Proc. of the 1999 U.S. DOE Hydrogen Program Review, NREL/CP–570–2693.

Berlowitz, P.J. and C.P. Darnell, "Fuel Choices for Fuel Cell Powered Vehicles," Society of Automotive Engineers, Paper 2000–01–0003.

Edlund, D. and W.A. Pledger, "An Integrated Fuel Processor for PEM Fuel Cells," Northwest Power Systems, LLC, Bend Oregon.

* cited by examiner

Primary Examiner—Carol Chaney
Assistant Examiner—Donald V. Scaltrito
(74) Attorney, Agent, or Firm—Philip H. Kier

(57) ABSTRACT

An integrated process and system for producing electricity for stationary purposes or for electric-powered vehicle using any of multiple hydrocarbon input fuels, a fuel cell, and a thermoelectric reformer that allows quick response to transient loads. Optional high-temperature and low-temperature water-gas shift reactors are used to convert carbon monoxide to carbon dioxide in the reformate stream; a hydrogen separator is used to remove carbon dioxide, carbon monoxide, and trace hydrocarbons; and a condenser is used to remove moisture from the reformate stream. Hydrogen gas not consumed in the fuel cell is stored or recycled for subsequent input to the fuel cell. $H_2O$ produced in the fuel cell is recycled for use in the reformer and water-gas shift reactors and is heated with waste heat from the fuel cell and carbon dioxide, carbon monoxide, and hydrocarbons from the hydrogen separator. A mixer is used to vaporize the input fuel prior to entering the thermoelectric reformer. Some of the electricity produced in the fuel cell is used for powering the thermoelectric reformer and is also stored for subsequent startup and peak load purposes.

24 Claims, 5 Drawing Sheets

THERMOELECTRIC REFORMER FUEL CELL PROCESS AND SYSTEM

BACKGROUND OF THE INVENTION

This invention pertains to fuel cells for producing electricity for vehicle propulsion and stationary uses. More particularly, it pertains to integrated fuel cell processes using thermoelectric reforming, hydrogen gas ($H_2$) purification, water-gas reactions, fuel cell stacks, waste heat management, and recycling of water and $H_2$.

Fuel cells convert chemical energy contained in a fuel directly into electrical energy. Because the conversion does not involve conversion of heat into mechanical energy, fuel cell efficiencies can exceed the Carnot Cycle limit by at least a factor of two. Also because they do not involve air combustion, use of fuel cells can reduce local air pollution, reduce quantities of greenhouse gases in the atmosphere, reduce oil imports, and reduce noise. For example as discussed by Berlowitz and Darnell for a current mid-sized automobile about 18% of the energy in the fuel is converted to work to drive the wheels, whereas, a vehicle with a fuel cell, utilizes 36% of the fuel's energy to achieve the same result. All fuel cells contain an anode and a cathode that are separated by an electrolyte. A hydrogen-rich gas is fed to the anode and oxygen is fed to the cathode. A catalyst separates the proton and electron in hydrogen atoms, allowing the protons to pass through a selective membrane. The electrons flow through an external circuit and combine with the oxygen ions and hydrogen ions, to form only water and electricity. The effectiveness of the chemical-to-electrical energy conversion is heavily dependent upon the choice of the electrolyte. Consequently, the electrolyte determines the category of the fuel cell.

Unlike batteries, fuel cells will continue to produce electricity as long as sources of hydrogen and oxygen are available. There are several options for supplying hydrogen to the fuel cell. Pure hydrogen can be stored locally and supplied to the fuel cell as needed. However, it is very expensive to transport and store hydrogen due to its low energy density. Another source of hydrogen is liquid or gaseous hydrocarbon fuels such as natural gas, methanol, ethanol, gasoline, diesel fuel, light hydrocarbons, vegetable oils, or biomass derived alcohols. To use a hydrocarbon fuel efficiently, it must be reformed into hydrogen and ultimately, carbon dioxide. The most common reforming methods include steam reforming, partial oxidation, and autothermal reforming.

Steam reforming uses steam and the hydrocarbon fuel to create hydrogen and carbon monoxide, which is further oxidized in a shift reaction to carbon dioxide. It uses an endothermic reaction, however, which reduces efficiency and limits the responsiveness of the system. Partial oxidation, such as taught by Werth in U.S. Pat. No. 5,925,322, utilizes air as the oxidant. However, air contains relatively large amounts of nitrogen that dilute the concentration of the hydrogen stream. Both steam reforming and partial oxidation typically employ sensitive catalysts to reduce temperature requirements and increase reaction rates. Contamination of the catalysts can limit their life, effectiveness, or both. Autothermal reformers are a combination of steam reforming and partial oxidation, and thereby have advantages of both as well as the shortcomings of both. Each of the above reformer tend to be large, heavy, and lack quick response to transient loadings, which is particularly limiting in on-board transportation applications.

Another, less common method of reforming hydrocarbon fuels is through the use of a thermoelectric device such as a thermal plasma, a microwave plasma, a plasma torch, or a flameless thermal pyrolysis systems. The benefits of a thermoelectric reforming method for the system are (1) the absence of air with the effect of dilution of hydrogen with nitrogen, and (2) rapid response times. The use of a thermoelectric reformer is also beneficial for the environment because it does not use combustion and consequently combustion gases are not exhausted. The use of a plasma reformer to produce hydrogen rich gas is taught is discussed by Cohn, et al. in U.S. Pat. No. 5,887,554 and by Bromberg et al. in U.S. Pat. No. 5,409,784. The use of a plasma reactor with microwave energies for the production of hydrogen from dissociation of hydrogen sulfide is taught by Harkness et al in U.S. Pat. No. 5,211,923. The use of a flameless thermal pyrolysis reactor to dissociate hazardous waste and hydrogen sulfide is taught by Wang in U.S. Pat. No. 5,614,156 and U.S. Pat. No. 5,843,395, respectively. Thermoelectric devices, have shorter response times owing to the use of ions and electromagnetic fields to promote the dissociation of the process gas. In such devices, the ionization energy created in the reactor is much higher than the fuel energy; therefore, transient fuel loading changes will not be sensitive to the overall energy retained in the reactor. That is to say, reforming or conversion from fuel to hydrogen is very fast compared to a steam reformer or partial oxidation reformer. Thermoelectric reformers take advantage of fast ion-molecule reactions during the exothermic heating and involve ions having energies higher than the thermal energy content of hydrocarbon fuels. The independence of fuel loading for the thermoelectric device is particularly important for the on-board fuel-cell powered vehicle applications. Since the thermal plasma (or ionization) reaction is fast, a compact and light weight design can be achieved without compromising the power output. There are two ways to reduce the warm-up time of the reformer (1) increasing the power density, and (2) decreasing the thermal capacity of the reformer. The longer the warm-up time, the larger the battery or ultra capacitor and the more metal hydride that is needed to initially start up the fuel cell system (FCS). Note that the larger battery sizes and more metal hydride will increase the total weight of the FCS and the space needed.

In addition to the above characteristics, thermoelectric devices can reform a wide variety of hydrocarbon fuels. They are not "poisoned" by fuel gas streams as are catalysts used in steam reformers, partial oxidation reformers, or autothermal reformers. Also, thermoelectric reformers are not sensitive to temperature as are catalysts used in the other types of reformers. The heat required to vaporize the methanol is nearly four times that of gasoline. Therefore, the current invention locates a fast mixing evaporator (mixer) in a high temperature zone using either waste heat from a carbon dioxide stream from a hydrogen separator or the fuel cell's waste heat stream to maximize utilization of waste energy.

A rule of thumb for the energy balance of internal combustion engines (ICEs) is that 33% of the energy produces useful power, 33% is rejected from the coolant, and 33% is exhausted from the exhaust system. On the other hand, for a fuel cell system 40% of the energy produces usefil power, 50% is rejected from the coolant, and 10% is exhausted from the exhaust system. The coolant temperature of a fuel cell system is significantly lower, typically 80° C., compared to an ICEs 120° C. In general, a significant fraction of the waste heat of an FCS must be rejected at a temperature lower than the fuel cell stack temperature for condensate recovery. This creates a significant challenge for designers of fuel cell systems. In the instant invention this problem is addressed by incorporating a thermal management system to recover waste heat produced in the fuel cell system. This system will recover waste heat for heating a metal hydride hydrogen storage system, producing steam for vaporizing the liquid fuel, and providing an air heating source for the occupant compartment in a vehicle or in a building.

Presence of carbon dioxide in the fuel cell dilutes $H_2$ and decreases the fuel cell's efficiency. Also, the concentration of carbon monoxide in the stream entering the fuel cell should be in the range of 50–100 ppm for maximum efficiency in view of the state of the art fuel cell technology. The present invention has means for removing carbon dioxide and carbon monoxide before entry to the fuel cell.

BRIEF SUMMARY OF THE INVENTION

The invention is a fuel cell process for producing electricity for stationary purposes or for electric-powered vehicles. A fuel cell produces electricity from hydrogen gas. A hydrocarbon fuel is input to the system and mixed with steam recycled from the fuel cell and a hot stream from the a hydrogen separator containing carbon dioxide, carbon monoxide and trace hydrocarbons. The carbon dioxide is then separated from the stream which is then preheated in a regenerative heat exchanger before entering a thermoelectric reformer where the hydrocarbon fuel and $H_2O$ react under high temperature to form hydrogen gas ($H_2$), carbon monoxide, and carbon dioxide. The reformate stream is then mixed with water and directed to a high temperature water-gas shift reactor, then to the regenerative heat exchanger where heat is transferred to preheat the fuel-steam mixture entering the thermoelectric reformer. After leaving the regenerative heat exchanger, the reformate stream is directed to a low-temperature water-gas shift reactor and to the hydrogen separator. The water-gas shift reactors convert carbon monoxide to carbon dioxide and creates additional hydrogen gas. The hydrogen-rich stream leaving the last water-gas shift reactor is directed to the hydrogen separator where impurities are removed and is then directed to a condenser where excess water is condensed. The saturated hydrogen stream from the condenser then enters the fuel cell. Most of the electricity produced in the fuel cell is used for the electrical load. However, electricity produced in the fuel cell is also used to power the thermoelectric reformer and is stored in an energy storage device for subsequent use in starting up the system when used intermittently in a vehicle and for responding to transient demand peaks. Hydrogen entering the fuel cell that is not consumed there, is stored, most likely in a metal hydride storage system, for subsequent mixing with the hydrogen stream from the hydrogen separator and is then recycled in the fuel cell. $H_2O$ from the fuel cell is recycled for use in the water-gas shift reactors and is heated with waste heat from the fuel cell prior to being mixed with input fuel. The waste heat that is contained in the exhaust air stream is used to heat recycled water, input fuel, and the hydrogen storage device within the FCS, and to provide heat energy sources external to the FCS. Because the $H_2$ reformer operates at high temperatures and more waste heat is produced than can be used internally, the extra heat can be recovered and used externally. In a vehicle application, the extra heat can be used to provide space heating for the passenger compartment; in stationary applications, the this heat can be used to space heating and hot water heating in buildings. Also the water produced by the FCS is more than enough for internal use in the system. The extra water can be used externally. An integrated control system responds to the load and controls the rate at which fuel enters the system and flow rates in the system. This system also monitors the system for proper operation.

The objectives of the present invention is to provide a fuel cell system with a thermoelectric reformer with: (1) high conversion efficiency in the reformer; (2) a reformer that does not use air combustion; (3) multi-fuel capabilities and fuel flexibility; (4) fast response to initial startup and transient load demands; (5) high efficiency in the fuel cell in producing electricity; (6) waste heat management; (7) $H_2O$ and unused $H_2$ recovery and direct use; (8) system automation; and (10) compact design for transportation applications.

DETAILED DESCRIPTION OF THE INVENTION

Figure 1:
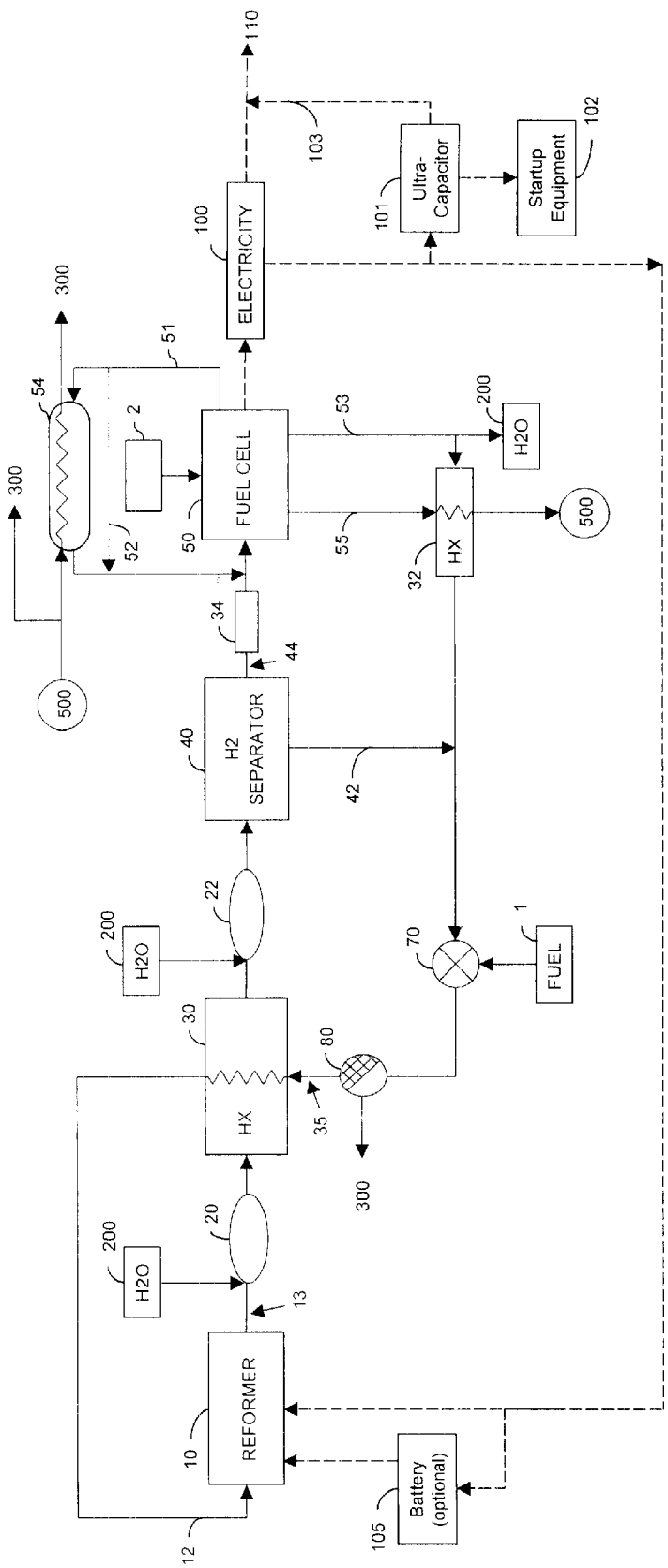
FIG. 1 is a schematic diagram of a preferred embodiment of the invention with two water-gas shift reactors.

With reference to FIG. 1, where the electrical circuit is shown with dashed lines and the process stream flows with solid lines, a hydrocarbon fuel 1 enters the fuel cell system and is mixed in mixer 70 with steam and a stream 42 from hydrogen separator 40 that may contain carbon dioxide ($CO_2$), carbon monoxide (CO), and trace hydrocarbons. Stream 42 provides a source of energy to vaporize fuel 1 in mixer 70. The hydrocarbon fuel could be natural gas, methanol, ethanol, gasoline, diesel fuel, light hydrocarbons, vegetable oils, biomass-derived alcohols, coal-derived fuels, or recovered waste. The hydrocarbon fuel can be either a liquid or a gas. If the fuel is already a gas, the reference to vaporizing the fuel means heating the fuel. The mixture is then directed to a $CO_2$ remover 80 where $CO_2$ is separated the steam-fuel mixture and is exhausted to the atmosphere or external regenerative heating devices 300. Because the FCS produces more waste heat than is needed for internal recycle purposes, and because of the high temperature nature of the $H_2$ reformer, these external heating devices can further waste heat for external use. Removing $CO_2$ from the fuel stream increases the efficiency of fuel cell 50 and allows excess hydrogen 51 exiting the fuel cell to be recycled without a build up of $CO_2$ in the recycle loop. The fuel-steam mixture 35 is then directed to a regenerative heat exchanger 30 where it is preheated prior to entering the inlet 12 of thermoelectric reformer 10. In the thermoelectric reformer, the hydrocarbon fuel and $H_2O$ react in high temperature ionic fields to form hydrogen gas ($H_2$), carbon monoxide, carbon dioxide, and trace hydrocarbons. Some of the electricity 100 produced in fuel cell 50, and optionally electricity from an auxiliary battery 105, is used to power the thermoelectric reformer 10.

Hydrogen gas, carbon monoxide, carbon dioxide, and trace hydrocarbons from the reformer, and $H_2O$ 200 pumped from the condensate of fuel cell 50 are directed to a high-temperature water-gas shift (HTS) reactor 20 where carbon monoxide is oxidized to carbon dioxide and $H_2O$ is reduced to $H_2$. The liquid water from the condensate of the fuel cell is added at the inlet of the HTS reactor 20 to further reduce the temperature by means of phase change heat of vaporization and to increase the efficiency of the CO conversion. For maximum effectiveness of the HTS reactor, the quantity of water added should be 20–50% in excess of the stoichiometric value. The output stream from the high-temperature water-gas shift reactor enters the regenerative heat exchanger 30, where it transfers heat to preheat the fuel-steam mixture 35 leaving the carbon dioxide remover 80. The HTS reactor has the benefit of a fast reaction rate. However, the amount of CO that it can oxidize is limited such that its outlet CO concentration is still usually in the range of 3–5 weight percent (30,000–50,000 ppm). Therefore, the cooled stream leaving the regenerative heat exchanger then enters low-temperature water-gas shift (LTS) reactor 22 that uses additional water 200 pumped from the condensate of fuel cell 50 to oxidize the CO contained in the reformate stream at a much slower rate than in the HTS reactor. As with the HTS reactor, the quantity of water added to the LTS reactor should be 20–50% in excess of the stoichiometric value. In the LTS reactor the concentration of CO is reduced from 3–5 weight percent to 0.5–1.0 weight percent (5,000–10,000 ppm). It would not be practical to use an LTS reactor without an HTS reactor to oxidize high concentrations of CO. Because of the slow reaction rates that it supports, a very large LTS reactor would be needed if there were no HTS reactor. Still, the desired concentration of CO is 50–100 ppm, several orders of magnitude lower than the concentration achievable in an LTS reactor; therefore, a hydrogen separator is needed.

The output of the LTS reactor is directed to hydrogen separator 40, which might be a ceramic or metal membrane, a pressure swing adsorber, or a temperature swing adsorber. Two streams leave the hydrogen separator. One stream 44 consists almost entirely of hydrogen and is directed to condenser 34 where excess moisture in the hydrogen stream is condensed to a saturation level prior to being fed into fuel cell 50, which operates at optimum efficiency when the hydrogen entering it is saturated. The other stream 42, mostly carbon dioxide and carbon monoxide, mixes with steam prior to entering mixer 70. The sensitive heat contained in stream 42 is also used to vaporize fuel 1 entering the system at mixer 70. Fuel cell 50 can be of several types, such as a proton exchange membrane type as taught by Edlund and Pledger of Northwest Power Systems, LLC, or a phosphoric acid type which are well known. The oxidant for the fuel cell is air 2 from an external source that is directed to the cathode by a compressor. There will be four streams leaving fuel cell 50: the output electricity 100, $H_2O$ 53, an exhaust air stream containing waste heat 55, and $H_2$ 51. Waste heat 55 is used in heat exchanger 32 to heat the portion of $H_2O$ stream 53 that with the input fuel 1 near the stoichiometric ratio of the input fuel-water reaction prior to entering mixer 70. To ensure that the fuel cell will operate at maximum efficiency, 80% of the hydrogen entering the fuel cell should be consumed. Therefore, hydrogen stream 51 should contain approximately 20% of the hydrogen entering the fuel cell. Hydrogen stream 51 is either recycled as stream 52 to reenter the fuel cell, or is stored in hydrogen storage system 54, or both. The hydrogen storage system can be a metal hydride, a nanotube system or any other disclosed hydrogen storage technology. In the case of a metal hydride, a heat source is required for the release of the stored hydrogen. The heat source in the instant invention is from the waste heat 500 contained in exhaust air stream 55 exiting heat exchanger 32, or during startup is from an electrical storage device. The heat used for the hydrogen storage system 54 is ultimately released to the atmosphere or external heat regenerative devices 300. During the idle stage of the hydrogen storage system (no release from this system), waste heat 500 is exhausted to the atmosphere or could be used to heat a passengers cabin in a vehicle application and to heat a building or provide hot water in a stationary application. If the hydrogen storage system 54 is at maximum storage capacity then the recycled hydrogen 51 will be directly diverted as stream 52 back into the fuel cell 50.

The function of the hydrogen storage system 54 is two-fold: (1) to provide supplemental hydrogen to the fuel cell 50 as needed; and (2) to serve as an initial source of hydrogen fuel for the fuel cell 50 upon startup of the entire system. A source of electrical energy is required in order for the thermoelectric reformer 10 to function. When the reformer 10 is cold, a short time will be required before the reformer 10 achieves normal operating conditions. During this startup period, reformer 10 receives electricity either from an auxiliary battery 105 or electricity generated from the fuel cell 50 itself using the hydrogen stored in the hydrogen storage system 54 and air 2 from the outside. By using the stored hydrogen to run the fuel cell, the capacity of the auxiliary battery can be reduced. Part of the electricity output 100 of the fuel cell will be directed to an electricity storage device 101, such as an ultra capacitor, where it is stored for subsequent use for powering startup equipment, such as a compressor for air 2 for fuel cell 50 operation, for the heat source for hydrogen storage system using a metal hydride, and for controls and instrumentation. The compressor will initially be powered by electricity from the electricity storage device 101 and eventually will be powered by electricity from the fuel cell 50 running on hydrogen from the hydrogen storage system 54 initially or from reformer 10 during normal operations. The electricity storage device will also serve as a source of electricity 103 to meet transient peak demands on the system. It will be kept in a charged state by the electrical output 100 of the fuel cell 50. Most of the electricity generated by the fuel cell 50 will be output of the fuel cell system and used to power target systems 110 such as the electrical systems of buildings or electric automobiles.

Figure 2:
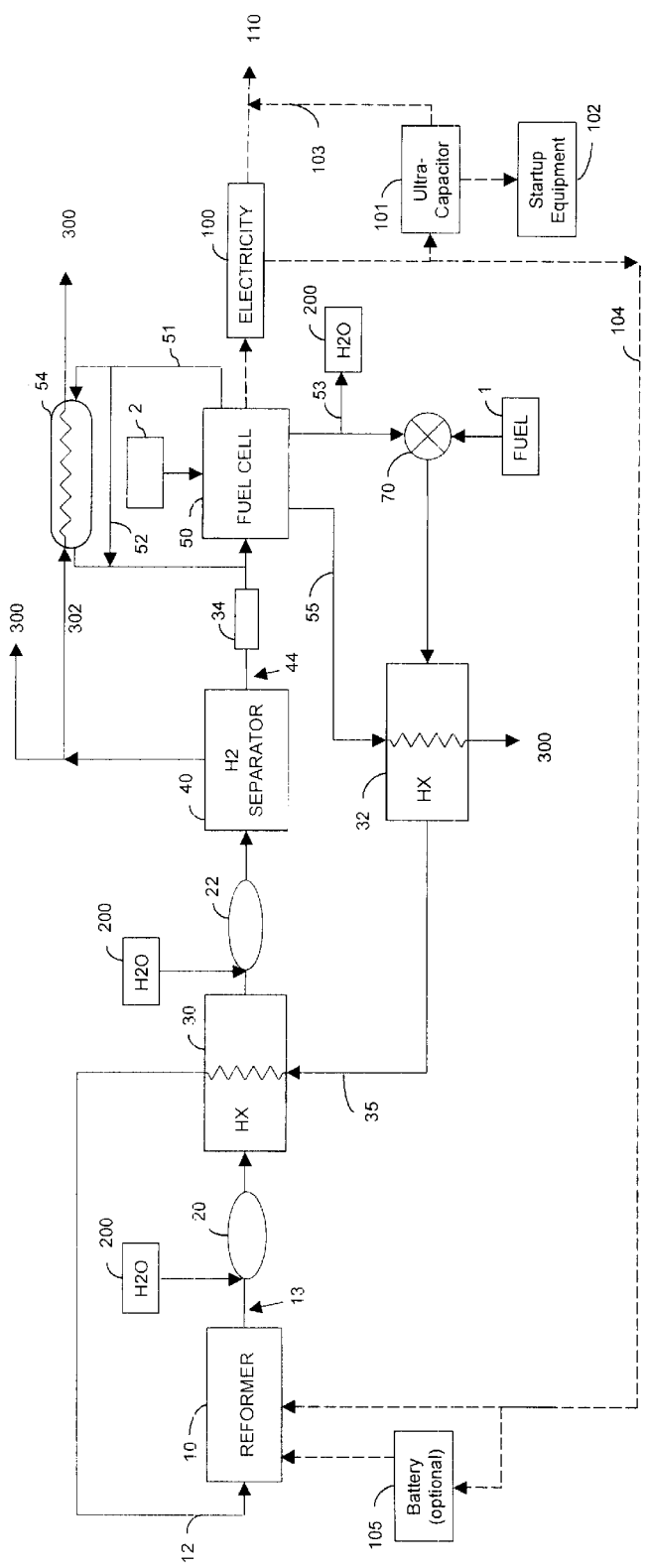
FIG. 2 is a schematic diagram of an alternative preferred embodiment with the hydrogen separator either exhausting to the atmosphere or external regenerative heating devices, or being routed to heat the hydrogen storage system.

FIG. 2 shows an alternative preferred embodiment with a different process for providing heat to vaporize the input fuel 1 and heat to release $H_2$ from the hydrogen storage system, if needed. The input fuel is mixed with a portion of the output water stream 53 from the fuel cell in mixer 70. This portion of the output water stream from the fuel cell is near the stoichiometric ratio for reacting with the input fuel. The resulting mixture is pumped to heat exchanger 32 where waste heat 55 from the fuel cell 50 is used to vaporize and superheat the mixture. Carbon dioxide and waste heat exhaust stream 42 that in the embodiment shown in FIG. 1 is used to vaporize the input fuel 1 is now either exhausted to the atmosphere or an external regenerative heating device 300 or as stream 302 is directed to the hydrogen storage system 54 to provide a heat source for the hydrogen storage system and is eventually exhausted to the atmosphere.

Figure 3:
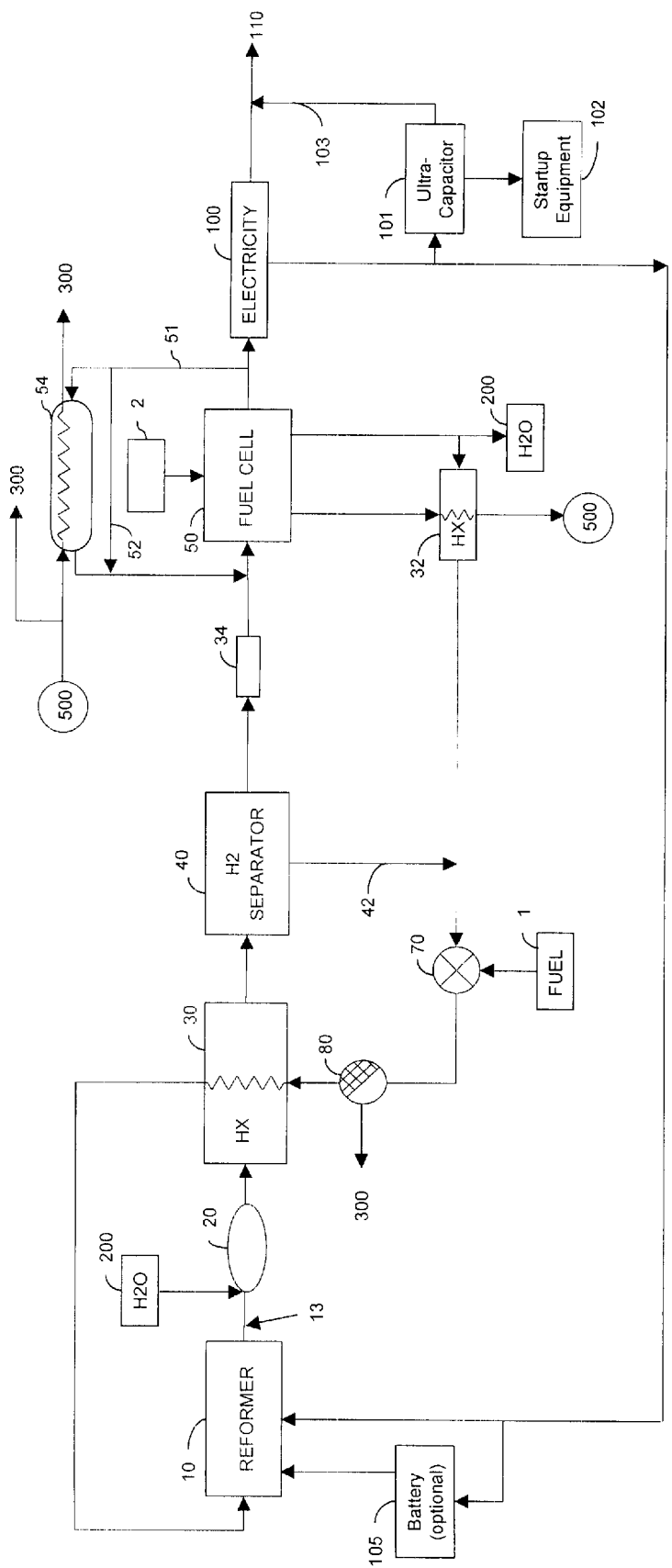
FIG. 3 is a schematic diagram of another preferred embodiment with only one water-gas shift reactors.

The purity of the reformate stream from a stream reformer, partial oxidation reformer, or autothermal reformer is low enough that both a HTS reactor and a LTS reactor would be needed. However, higher purities can be obtained with thermoelectric reformer. When a high degree of purity (5,000–10,000 ppm of carbon monoxide) can be attained in the stream leaving the regenerative heat exchanger 30, the embodiment used in FIG. 3 can be used. In this preferred embodiment, low-temperature water-gas shift (LTS) reactor 22, shown in FIGS. 1 and 2 is not needed and the output stream from the regenerative heat exchanger 30 to directed to the hydrogen separator 40. In this embodiment, carbon dioxide and waste heat exhaust stream 42 is still directed to mixer 70 where its heat content is added to the superheated $H_2O$ vapor from heat exchanger 32 to vaporize input fuel 1 prior to entering the thermoelectric reformer 10. The carbon dioxide in the mixture is removed by carbon monoxide mixer 80 before entering the regenerative heat exchanger 30.

Figure 4:
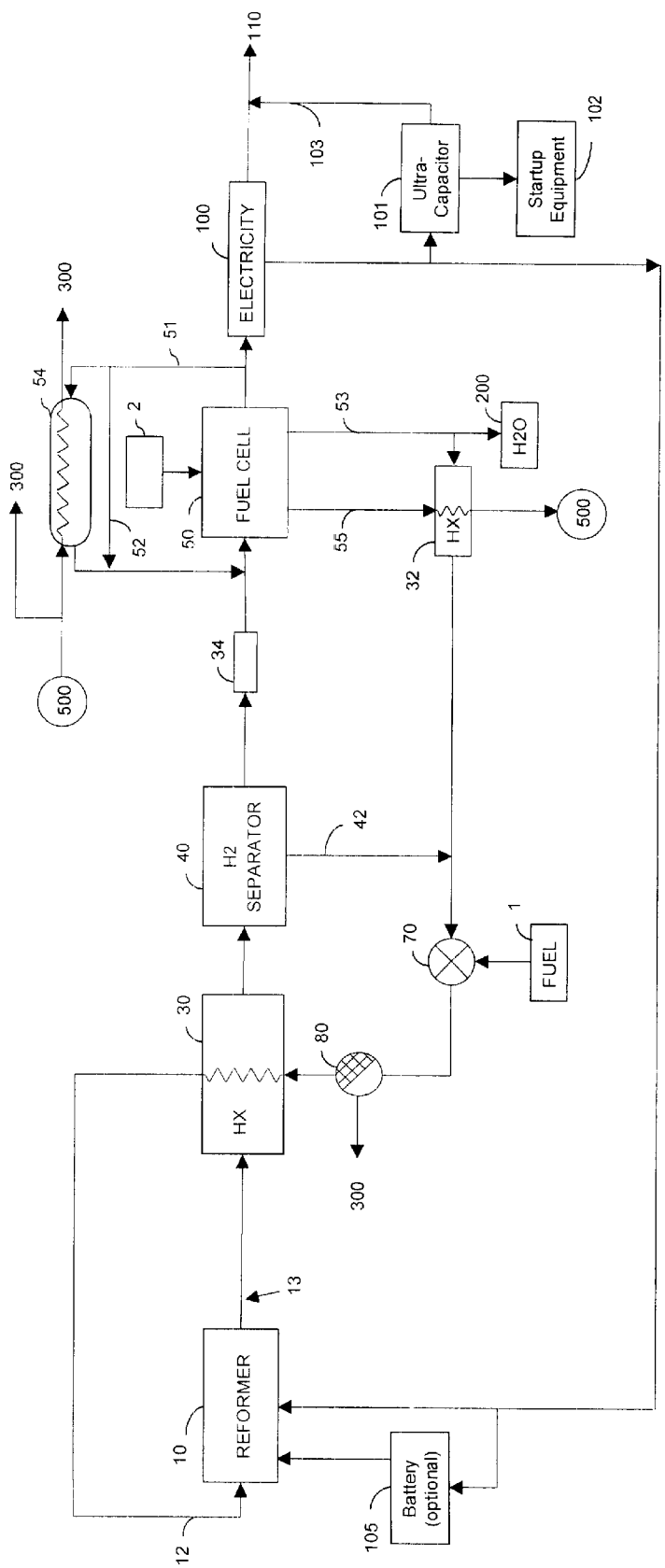
FIG. 4 is a schematic diagram of another preferred embodiment with no water-gas shift reactors.

When a high degree of purity (5,000–10,000 ppm of carbon monoxide) can be attained in the reformate stream directly leaving the thermoelectric reformer 10, the embodiment used in FIG. 4 can be used. In this embodiment no water-gas shift reactors are needed and the reformate stream leaving the thermoelectric reformer is directed to the regenerative heat exchanger 30. FIG. 2 shows an embodiment that has two water-gas shift reactors in which carbon dioxide waste stream 42 is exhausted to the atmosphere or to an external regenerative heating device 300, or heats the hydrogen storage system. Although not shown in the figures, this disposition of stream 42 could also be used when there is one water-gas shift reactor, or no water-gas shift reactors.

Figure 5:
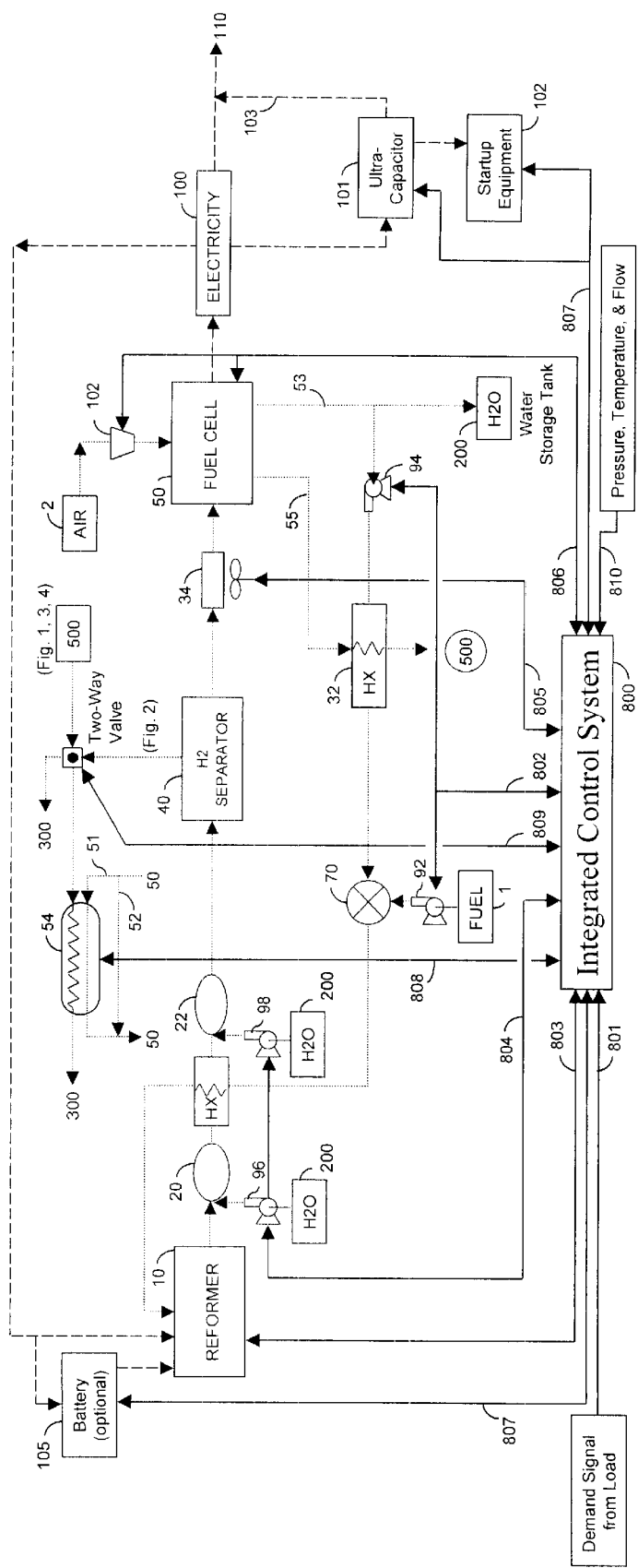
FIG. 5 is a schematic diagram of an integrated control system (ICS) that monitors and controls the entire fuel cell system.

An integrated control system (ICS) 800 for the thermoelectric fuel cell system is shown in FIG. 5. In FIG. 5, solid lines represent control and monitoring signals; dashed lines represent flow of electricity; and dotted lines represent process stream flows. The ICS 800 receives a demand signal from the load 110 and compares the demand signal 801 with the electrical output 100 from the fuel cell, 50. Based on the comparison, the ICS will increase or decrease the quantity of input fuel reaching reformer 10 by controlling 802 pump 92 for the input fuel and pump 94 for the portion of water 53 exiting heat exchanger 32 that is mixed with the input fuel 1 in mixer 70. As the fuel flow rate to the reformer changes, the ICS will monitor 803 the temperature, pressure, and flows specific to the reformer 10 and adjust the reformer's power usage to maintain the desired (or set-point) temperature. Temperature, pressure and flow rates for other system components are monitored 810 also. As the power level in the fuel cell 50 changes, the flow of gases from the reformer through the entire fuel cell system will also change, which will require changes in other inputs affecting the system. These changes include: an increase or decrease in the flow rates of water 53 from the fuel cell being directed 804 to the high temperature water-gas shift reactor by pump 96 and being directed to the low temperature water-gas shift reactor by pump 98; an increase or decrease in the rate of condensation in condenser 34 as controlled 805 by the cooling air flow rate; and an increase or decrease in the flow rate of air 2 directed 806 to the cathode in the fuel cell 50.

In addition to its control function, the ICS 800 monitors the fuel cell system for proper operation and provides indications to the system operator of system malfunctions or equipment failures. Therefore, the ICS generally monitors temperatures, pressures, flow rates, and electric power output 100 from the fuel cell. The parameters measured include inputs to the fuel cell 50, such as the flow rate of air 2, flow rate of hydrogen gas from the condenser 34, hydrogen recycle flow rate 51, and water 53 flow rate. The status of startup equipment 102 is monitored 807 and controlled to ensure proper control during initial operation. Pressure, temperature, flow rates into and out of the reformer 10 and power usage (amperes) are all measured and monitored for proper operation. Another important parameter monitored 808 by the ICS is the amount of hydrogen stored in the hydrogen storage system 54. When the hydrogen storage system is a metal hydride system, the ICS controls its charging and discharging 809. The hydrogen storage system 54 is used during normal operations and startup to provide hydrogen to the fuel cell 50. The startup process including the use of auxiliary battery 105, if present, and electricity storage device 101, for powering startup equipment 102 is controlled 807 by the integrated control system.

The following procedure can be used to start up the thermoelectric fuel cell system. Electricity storage device 101 provides electricity to the ICS and startup equipment 102 such as the compressor to supply air 2 that is directed to the cathode of fuel cell 50. Concurrently, battery 105 is heating up the reformer 10 and hydrogen gas stored in the hydrogen storage system 54 is supplied to fuel cell 50 to produce electricity. When the hydrogen storage system uses a metal hydride (such as lithium hydride, aluminum hydride, or zirconium hydride) the metal hydride is initially heated by an electric heat source powered by the electricity storage device 101. Once the fuel cell is producing power and heat, the metal hydride is discharged by using recycled waste heat 500 from the fuel cell and heat exchanger 32, or for the embodiment shown in FIG. 2, by using waste heat 302 from the hydrogen separator 40. Once the fuel cell starts to produce electricity, part of that electricity will be directed to the reformer and will heat the reformer so that the auxiliary battery 105 can be turned off. After the temperature in reformer 10 reaches its set point, fuel 1 and water 53 from the fuel cell will be supplied to mixer 70. Finally, the system will be switched to use hydrogen gas supplied directly from reformer 10 once the reformer has reached its set-point temperature and gas clean-up units, such as the water-gas shift reactors and the hydrogen separator, can produce acceptable carbon monoxide concentrations in the entry to the fuel cell.

To achieve optimum performance, several conditions should be met. To maximize the efficiency of the system, heat recovery from the fuel cell is needed. The input fuel 1 flow rate must match the hydrogen gas requirements for the fuel cell and the electrical power output requirements. The reformer 10 must be able to process methanol or other fuels at the rate to meet the fuel cell systems maximum output requirements. Also, the reformer must be capable of providing a fast response to rapidly and widely fluctuating loads even if the ultra capacitor will respond to those fluctuating peak loads, especially for on-board transportation applications. Since fuel reformation occurs at an elevated temperature, the reformer must reach its operating temperature and produce $H_2$ within a few seconds from cold start for general automotive applications, although longer start-up times may be acceptable for fleet and mass transport applications. Such rapid response rates are most readily attained when the reformer is a thermoelectric reformer. An integrated control system and startup procedure as described will allow optimum operating conditions to be maintained over a wide range of feed rates and hydrogen output (purity)

The following table is an example of the mass flow rates (moles/hr) of hydrogen gas ($H_2$), carbon monoxide, carbon dioxide, and $H_2O$ at four locations when the fuel cell system is used for producing 50 kilowatts of electricity as an on-board vehicle fuel cell system. The four locations are the exit stream 13 from the reformer, the exit of the high-temperature steam-gas shift reactor 20, the exit of the hydrogen separator 40, and the entry to the fuel cell 50

| Moles/hr | After Refomer | | After HTS | | After H2-Sep | | Entering FCell | |
|---|---|---|---|---|---|---|---|---|
| | Moles | MoleFrac | Moles | MoleFrac | Moles | MoleFrac | Moles | MoleFr |
| $H_2$ | 2.1139 | 0.567 | 2.7159 | 0.688 | 2.6616 | 0.948 | 3.38 | 0.972 |
| CO | 0.6547 | 0.176 | 0.0527 | 0.013 | 0.0516 | 0.018 | 0.0 | 0.0 |
| $CO_2$ | 0.2769 | 0.074 | 0.8789 | 0.223 | 0.0176 | 0.006 | 0.0693 | 0.020 |
| $H_2O$ | 0.6809 | 0.183 | 0.3012 | 0.076 | 0.0782 | 0.028 | 0.0267 | 0.008 |
| Total | 3.7264 | 1.00 | 3.9486 | 1.00 | 2.8091 | 1.00 | 3.4760 | 1.00 |

What is claimed is:

1. A process for producing electricity in a fuel cell with an anode and a cathode comprising:
   heating an input hydrocarbon fuel and mixing with steam and producing a vapor fuel and steam mixture;
   passing the vapor fuel and steam mixture to a thermoelectric reformer where hydrocarbon fuel and steam are dissociated to form hydrogen gas;
   separating hydrogen gas from impurities in the reformate stream in a hydrogen separator to create a stream with moist hydrogen gas and a stream with impurities;
   passing the moist hydrogen gas stream to a condenser to condense out moisture in the moist hydrogen gas stream and leaving a saturated hydrogen gas stream;
   passing the saturated hydrogen gas stream from the condenser to the fuel cell and supplying air to the cathode of the fuel cell, utilizing most of the hydrogen gas entering the fuel cell, and producing electricity, waste heat, and water;
   passing the electricity produced in the fuel cell to meet load demands, to power the thermoelectric reformer, and to an electricity storage device;
   storing part of the hydrogen gas from the fuel cell in a hydrogen storage device and mixing part of the hydrogen gas from the fuel cell with the hydrogen gas stream entering the fuel cell;
   measuring electricity output of the fuel cell, measuring fuel input and measuring inlet and outlet temperatures, pressures, and flow rates at the reformer, and at the fuel cell; and
   comparing the load demands with the electricity produced in the fuel cell and controlling flow rates, temperatures, and pressure, and adjusting the electricity produced in the fuel cell to meet the load demand.

2. A process for producing electricity as set forth in claim 1 further comprising passing part of the hydrogen not utilized in the fuel cell to a hydrogen storage device, and mixing the hydrogen not passed to the hydrogen storage device with the saturated hydrogen gas from the condenser prior to entry to the fuel cell.

3. A process for producing electricity as set forth in claim 2 further comprising preheating the vapor fuel-steam mixture in a regenerative heat exchanger by transferring heat from the reformate stream from the thermoelectric reformer.

4. A process for producing electricity as set forth in claim 3 further wherein the input hydrocarbon fuel is heated by mixing with steam produced by heating water produced in the fuel cell with waste heat produced in the fuel cell in a second heat exchanger and with the impurities stream from the hydrogen separator.

5. A process as set forth in claim 4 further comprising passing the stream with vapor hydrocarbon fuel to a carbon dioxide remover and then passing the stream with vapor hydrocarbon fuel to the regenerative heat exchanger.

6. A process for producing electricity as set forth in claim 5 further comprising passing the reformate stream from the thermoelectric reformer and water produced in the fuel cell to a high-temperature water-gas shift reactor, oxidizing carbon monoxide to carbon dioxide, producing additional hydrogen gas in the high-temperature water-gas shift reactor, producing a high-temperature water-gas shift reactor output stream, then passing the high-temperature water-gas shift reactor output stream to the regenerative heat exchanger, and measuring inlet and outlet temperature, pressures, and flow rates at high-temperature water-gas shift reactor.

7. A process for producing electricity as set forth in claim 6 further comprising passing the stream cooled in the regenerative heat exchanger and water produced in the fuel cell to a low-temperature water-gas shift reactor, oxidizing carbon monoxide to carbon dioxide, producing additional hydrogen gas in the low-temperature water-gas shift reactor, producing a low-temperature water-gas shift reactor output stream, then passing the low-temperature water-gas shift reactor output stream to the hydrogen separator, and measuring inlet and outlet temperature, pressures, and flow rates at the low-temperature water-gas shift reactor.

8. A process for producing electricity as set forth in claim 3 further comprising mixing the input hydrocarbon fuel with water produced in the fuel cell and then heating the hydrocarbon fuel and water mixture in a heat exchanger using waste heat from the fuel cell and forming a vapor fuel-steam mixture.

9. A process for producing electricity as set forth in claim 8 further comprising passing the reformate stream from the thermoelectric reformer and water produced in the fuel cell to a hih-temperature water-gas shift reactor, oxidizing carbon monoxide to carbon dioxide, producing additional hydrogen gas in the high-temperature water-gas shift reactor, producing a high-temperature water-gas shift reactor output stream, then passing the high-temperature water-gas shift reactor output stream to the regenerative heat exchanger, and measuring inlet and outlet temperature, pressures, and flow rates at the high-temperature water-gas shift reactor.

10. A process for producing electricity as set forth in claim 9 further comprising passing the stream cooled in the regenerative heat exchanger and water produced in the fuel cell to a low-temperature water-gas shift reactor, oxidizing carbon monoxide to carbon dioxide, producing additional hydrogen gas in the low-temperature water-gas shift reactor, producing a low-temperature water-gas shift reactor output stream, then passing the low-temperature water-gas shift reactor output stream to the hydrogen separator, and measuring inlet and outlet temperature, pressures, and flow rates at the low-temperature water-gas shift reactor.

11. A process for producing electricity as set forth in claim 7 wherein a compressor is used in supplying air to the cathode of the fuel cell.

12. A process for producing electricity as set forth in claim 11 further comprising starting up the fuel cell by using electricity stored in the electricity storage device to start the compressor for air introduced to the cathode, passing hydrogen from the hydrogen storage device to the fuel cell, and starting up the thermoelectric reformer with the electricity produced in the fuel cell.

13. A process for producing electricity as set forth in claim 11 further comprising starting up the fuel cell by using electricity stored in the electricity storage device to start the compressor for air introduced to the cathode, passing hydrogen from the hydrogen storage device to the fuel cell, and starting up the thermoelectric reformer with the electricity produced in the fuel cell and with electricity from an auxiliary battery.

14. A process for producing electricity as set forth in claim 7 wherein the electricity storage device is an ultra capacitor.

15. A process for producing electricity as set forth in claim 14 wherein the hydrogen storage device uses a metal hydride, the metal hydride being heated by waste heat from the second heat exchanger or during start-up by electricity from the electricity storage device.

16. A process for producing electricity as set forth in claim 10 wherein a compressor is used in supplying air to the cathode of the fuel cell.

17. A process for producing electricity as set forth in claim 16 further comprising starting up the fuel cell by using electricity stored in the electricity storage device to start the compressor for air introduced to the cathode, passing hydrogen from the hydrogen storage device to the fuel cell, and starting up the thermoelectric reformer with the electricity produced in the fuel cell.

18. A process for producing electricity as set forth in claim 16 further comprising starting up the fuel cell by using electricity stored in the electricity storage device to start the compressor for air introduced to the cathode, passing hydrogen from the hydrogen storage device to the fuel cell, and starting up the thermoelectric reformer with the electricity produced in the fuel cell and with electricity from an auxiliary battery.

19. A process for producing electricity as set forth in claim 10 wherein the electricity storage device is an ultra capacitor.

20. A process for producing electricity as set forth in claim 19 wherein the hydrogen storage device uses a metal hydride the metal hydride being heated by waste heat from the hydrogen separator or during start-up by electricity from the electricity storage device.

21. A process for producing electricity as set forth in claim 20 further comprising exhausting to the atmosphere waste heat produced in the fuel cell that is not used internally in the process.

22. A process for producing electricity as set forth in claim 20 further comprising passing waste heat produced in the fuel cell that is not used internally in the process to external regenerative heating devices.

23. A process for producing electricity as set forth in claim 15 further comprising exhausting to the atmosphere waste heat produced in the fuel cell that is not used internally in the process.

24. A process for producing electricity as set forth in claim 15 further comprising passing waste heat produced in the fuel cell that is not used internally in the process to external regenerative heating devices.

* * * * *